United States Patent
Meaux et al.

(10) Patent No.: US 11,983,588 B2
(45) Date of Patent: May 14, 2024

(54) SYSTEMS AND METHODS FOR ASSOCIATING ASSETS WITH UNIQUE IDENTIFIERS CORRESPONDING TO IDENTIFICATION TAG-BEARING LABELS THAT ARE DESIGNED TO BE AFFIXED TO THE ASSETS

(71) Applicant: Brady Worldwide, Inc., Milwaukee, WI (US)

(72) Inventors: Adam Meaux, Milwaukee, WI (US); Zachary Van Dam, Grafton, WI (US); Quinn Thomas Stephan, Wauwatosa, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 17/734,337

(22) Filed: May 2, 2022

(65) Prior Publication Data
US 2023/0351138 A1    Nov. 2, 2023

(51) Int. Cl.
*G06K 19/07* (2006.01)
*G06K 7/10* (2006.01)

(52) U.S. Cl.
CPC ..... *G06K 19/0723* (2013.01); *G06K 7/10009* (2013.01)

(58) Field of Classification Search
CPC ....................... G06K 7/10009; G06K 19/0723
See application file for complete search history.

(56) References Cited

U.S. PATENT DOCUMENTS

| | | | |
|---|---|---|---|
| 9,665,848 B1* | 5/2017 | Johnson | G08B 13/2417 |
| 2003/0095032 A1 | 5/2003 | Hoshino et al. | |
| 2004/0039735 A1* | 2/2004 | Ross | G06Q 30/06 |
| 2005/0206555 A1 | 9/2005 | Bridgelall et al. | |
| 2006/0026197 A1 | 2/2006 | Quinn et al. | |
| 2009/0327102 A1 | 12/2009 | Maniar et al. | |

(Continued)

FOREIGN PATENT DOCUMENTS

WO    2021041697 A1    3/2021

OTHER PUBLICATIONS

International Search Report and the Written Opinion of The International Searching Authority, or the Declaration dated Jul. 18, 2023.

(Continued)

*Primary Examiner* — Omer S Khan
(74) *Attorney, Agent, or Firm* — Thomas M. Hardman

(57) ABSTRACT

A label printing program running on a computing system can associate assets with unique identifiers (UIDs) corresponding to ID tag-bearing labels that are designed to be affixed to the assets. In response to user input selecting an asset for which ID tag-bearing labels should be printed, the label printing program can send command(s) to a printing system that cause an ID tag reader within the printing system to read an ID tag from an unprinted label and determine a UID associated with the ID tag. In response to receiving the UID from the printing system, the label printing program can update a data record that is associated with the asset with the UID associated with the ID tag. The printing system can also print relevant asset information on the unprinted label, thereby creating a printed label that can be affixed to the asset.

15 Claims, 9 Drawing Sheets

(56) References Cited

U.S. PATENT DOCUMENTS

| | | |
|---|---|---|
| 2010/0283584 A1 | 11/2010 | Mcallister |
| 2011/0084813 A1* | 4/2011 | Mullin ................. G06Q 10/087 |
| | | 340/10.4 |
| 2014/0197991 A1 | 7/2014 | Mkrtchyan et al. |
| 2016/0026837 A1 | 1/2016 | Good et al. |
| 2016/0045398 A1 | 2/2016 | Lai et al. |
| 2016/0104104 A1 | 4/2016 | Ozkan |
| 2016/0189174 A1 | 6/2016 | Heath |
| 2019/0005283 A1 | 1/2019 | Nikitin et al. |
| 2019/0087702 A1* | 3/2019 | Cotoc ...................... G06K 1/18 |
| 2019/0107411 A1* | 4/2019 | Gil ........................ G06Q 10/047 |
| 2019/0213462 A1* | 7/2019 | McDonald ....... G06K 19/06178 |
| 2019/0266865 A1 | 8/2019 | Testanero et al. |
| 2020/0074125 A1 | 3/2020 | Rein et al. |

OTHER PUBLICATIONS

Extended European Search Report dated Aug. 21, 2023; Application No. 20857047.3-8 pages.

\* cited by examiner

SYSTEMS AND METHODS FOR ASSOCIATING ASSETS WITH UNIQUE IDENTIFIERS CORRESPONDING TO IDENTIFICATION TAG-BEARING LABELS THAT ARE DESIGNED TO BE AFFIXED TO THE ASSETS

CROSS-REFERENCE TO RELATED APPLICATIONS

N/A

BACKGROUND

The present disclosure is generally related to identification tags. The term "identification tag" (or simply "ID tag") refers to an electronic identification device. Some examples of ID tags include near-field communication (NFC) tags and radio-frequency identification (RFID) tags.

An ID tag typically includes a radio transponder. An ID tag can be configured so that when the transponder is triggered by an electromagnetic interrogation pulse from a nearby reader device, the ID tag transmits data back to the reader device. The data that is transmitted back to the reader device typically includes a unique identifier (UID) that is uniquely associated with the ID tag.

A device that reads ID tags may be referred to herein as an ID tag reader. ID tags and ID tag readers can work together to facilitate identification and tracking of objects.

Some aspects of the present disclosure are related to a scenario in which ID tags are embedded in printed labels that are affixed to assets. A printed label that includes an embedded ID tag may be referred to herein as an "ID tag-bearing label."

ID tag-bearing labels can be affixed to many different types of assets. As an example, ID tag-bearing labels can be affixed to computing assets, such as electronic cables, servers, networking devices (e.g., switches, routers), or the like.

There are many different reasons why it can be beneficial to affix ID tag-bearing labels to assets. For example, in a computing context, the use of ID tag-bearing labels can assist the operators of a datacenter to track and maintain computing assets in the datacenter. This is described in greater detail in co-pending U.S. patent application Ser. No. 17/637,530 ("the '530 application"), titled "Storing and Retrieving Identification Tag Data Associated with an Asset," the contents of which are hereby incorporated by reference in their entirety.

In a scenario where ID tag-bearing labels are affixed to assets, it can be beneficial to know which ID tags correspond to which assets. More specifically, it can be beneficial to know, for each asset, the UID of the ID tag that is embedded in the printed label that is affixed to the asset. This information can be used in many different ways, some of which are described in the '530 application.

Where a large number of assets are involved, however, there is not currently an efficient way to determine the UIDs corresponding to the ID tag-bearing labels that are affixed to the assets. It is possible to determine this information for a single asset, or even for a small group of assets. Someone could, for example, use an ID tag reader to read the ID tag that is embedded in a label that is affixed to a particular asset, and that person could then manually record the UID along with information identifying the corresponding asset. However, it is not practical or realistic to do this for a large group of assets. It would take far too much time, and there would also not be any way to ensure that the information about the UIDs and their corresponding assets are correctly recorded.

Accordingly, benefits can be realized by techniques for efficiently and accurately associating assets with UIDs corresponding to ID tag-bearing labels that are designed to be affixed to the assets.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The systems and methods disclosed herein are directed to efficiently associating assets with UIDs corresponding to ID tag-bearing labels that are designed to be affixed to the assets.

In accordance with the present disclosure, a computing system can be communicatively coupled to a printing system that is configured to print certain information on ID tag-bearing labels. The printing system can include an ID tag reader that is configured to read the ID tags in the ID tag-bearing labels and determine the UIDs associated with the ID tags.

The computing system can include a label printing program that enables the user to control various aspects of the printing system. A user of the computing system can use the label printing program to cause the printing system to print ID tag-bearing labels for a plurality of assets. Advantageously, the label printing program can be configured to automatically associate the assets with UIDs corresponding to the ID tag-bearing labels.

A file can be provided that includes information about the plurality of assets. This type of file may be referred to herein as an asset definition file, and the information contained in the file may be referred to as asset information. The label printing program can be configured to parse the asset definition file to determine the asset information. Once the asset information has been determined, the label printing program can display the asset information to the user via a graphical user interface (GUI). The user can then select, via the GUI, the asset(s) for which ID tag-bearing labels should be printed.

When the user wants to print an ID tag-bearing label for a particular asset, the user can provide user input, via the GUI, to cause this to occur. More specifically, the user can provide user input that selects the asset and requests the printing of an ID tag-bearing label for the asset.

In response to receiving this user input, the label printing program can send one or more commands to the printing system that cause the ID tag reader within the printing system to read an ID tag from an unprinted label and thereby determine a UID associated with the ID tag. The printing system can send the UID back to the label printing program. The command(s) sent by the label printing program can also cause the printing system to print relevant asset information (e.g., an identifier for the asset, a description of the asset) on the unprinted label, thereby creating a printed label that can be affixed to the asset.

In response to receiving the UID from the printing system, the label printing program can update the asset definition file. More specifically, the label printing program can update a data record that is associated with the asset for which the ID tag-bearing label is being printed. The data record can be updated with the UID associated with the ID tag.

Thus, when an ID tag-bearing label is printed for an asset, the UID corresponding to the ID tag can be associated with the relevant asset information in the asset definition file. Advantageously, the association of the UID and the relevant asset information can occur automatically. In addition, the association of the UID and the relevant asset information can occur at the time the ID tag-bearing label is printed, thereby minimizing the likelihood of error.

Although the above discussion has described the printing of a single ID tag-bearing label for a single asset, the systems and methods disclosed herein can be utilized to print ID tag-bearing labels for a large number of assets. The process described above in relation to the creation of a single printed ID tag-bearing label for a single asset can be repeated each time a new printed ID tag-bearing label is created. When ID tag-bearing labels are printed for a large number of assets, the systems and methods disclosed herein enable UIDs corresponding to the ID tags in the ID tag-bearing labels to be automatically associated with the relevant asset information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
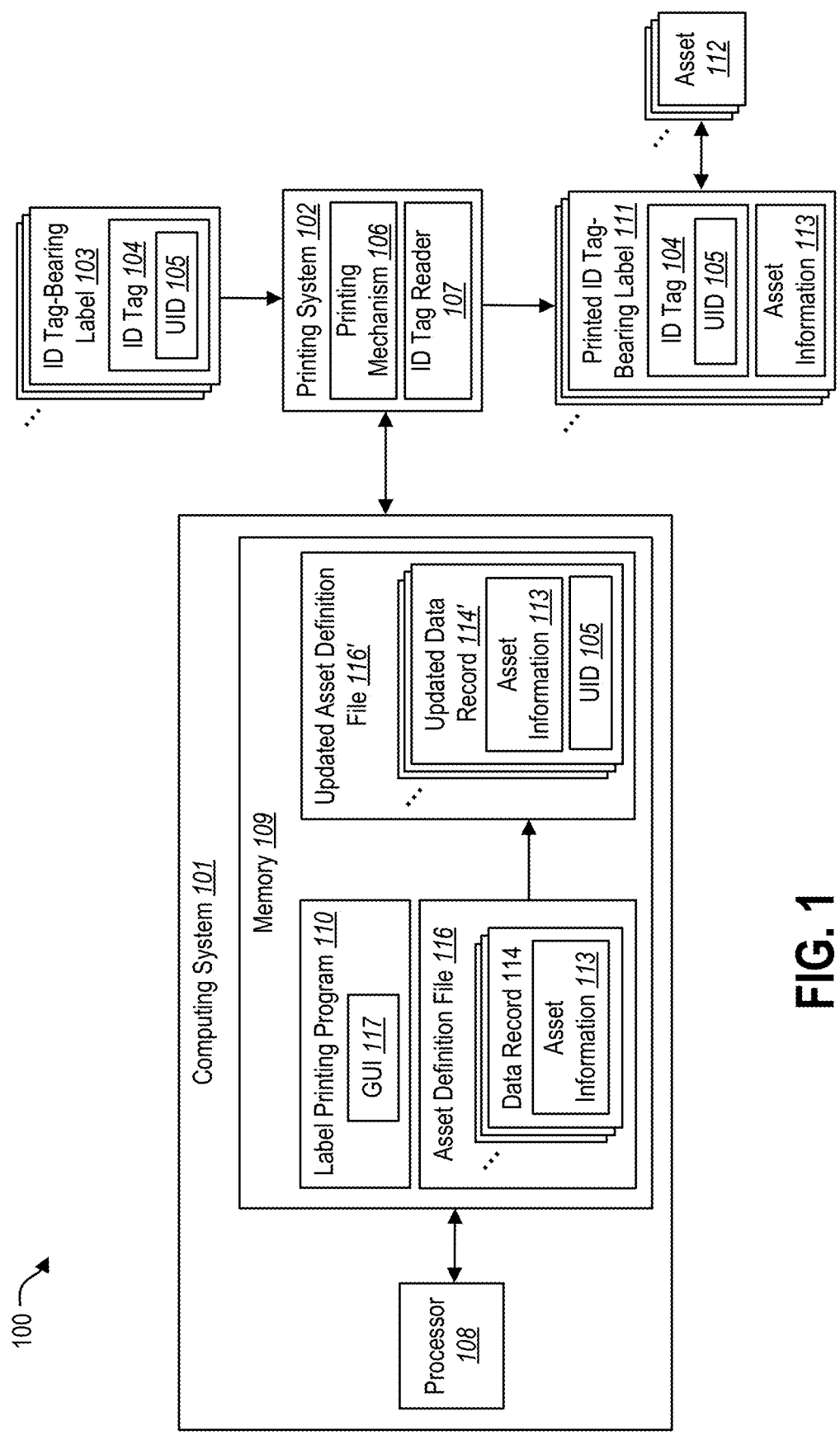
FIG. 1 illustrates an example of a system in which the techniques disclosed herein can be utilized, the system including a label printing program running on a computing system that is communicatively coupled to a printing system that includes an ID tag reader.

FIG. 1 illustrates an example of a system 100 in which the techniques disclosed herein can be utilized. The system 100 includes a computing system 101 that is communicatively coupled to a printing system 102. The printing system 102 is configured to print certain information on ID tag-bearing labels. A plurality of unprinted ID tag-bearing labels 103 are shown in FIG. 1. Each unprinted ID tag-bearing label 103 includes an ID tag 104. Each ID tag 104 is associated with a particular UID 105.

The printing system 102 includes a printing mechanism 106 that is configured to make a persistent representation of text or graphics on a substrate, such as an ID tag-bearing label 103. There are a variety of different printing technologies that the printing mechanism 106 can be configured to utilize. In some embodiments, the printing mechanism 106 can be configured to utilize thermal printing technology by selectively heating regions of a heat-sensitive substrate. Alternatively, in other embodiments, the printing mechanism 106 can be configured to utilize another type of printing technology, such as dye sublimation, laser printing, or the like.

The printing system 102 also includes an ID tag reader 107. The ID tag reader 107 is configured to read the ID tags 104 in the ID tag-bearing labels 103 and determine the UIDs 105 associated with the ID tags 104.

The computing system 101 includes a processor 108 and memory 109 communicatively coupled to the processor 108. The computing system 101 also includes a label printing program 110 that enables a user of the computing system 101 to control various aspects of the printing system 102. The label printing program 110 includes a plurality of instructions that are stored in the memory 109 and executable by the processor 108 to perform the operations that are described herein in relation to the label printing program 110.

A user of the computing system 101 can use the label printing program 110 to cause the printing system 102 to print information on the unprinted ID tag-bearing labels 103, thereby creating printed ID tag-bearing labels 111 that can be affixed to assets 112. The information that is printed on a particular printed ID tag-bearing label 111 can include asset information 113 related to the asset 112 to which the printed ID tag-bearing label 111 is going to be affixed. There are many different kinds of asset information 113 that can be printed on an ID tag-bearing label 103 in connection with an asset 112. Some examples of asset information 113 include an alphanumeric identifier corresponding to the asset 112, a descriptive name for the asset 112, a picture of the asset 112, a graphical representation of the asset 112, and combinations of the foregoing.

Advantageously, the label printing program 110 is configured to automatically associate the assets 112 with UIDs 105 corresponding to the printed ID tag-bearing labels 111. In general terms, this involves interrogating the ID tag reader 107 in the printing system 102 when an ID tag-bearing label 103 is about to be printed and requesting the UID 105 associated with the corresponding ID tag 104. The label printing program 110 can then update a data record 114 corresponding to the relevant asset 112 with the UID 105 that is returned by the ID tag reader 107.

The label printing program 110 can create associations between UIDs 105 and assets 112 in an asset definition file 116. The asset definition file 116 is a file that includes asset information 113, i.e., information about the assets 112 for which the printed ID tag-bearing labels 111 are going to be created. The asset information 113 can be included among a plurality of data records 114. There can be at least one data record 114 for each asset 112 for which a printed ID tag-bearing label 111 is going to be created.

The label printing program 110 can be configured to parse the asset definition file 116 to determine the asset information 113. Once the asset information 113 has been determined, the label printing program 110 can display the asset information 113 to the user via a GUI 117. The user can then select, via the GUI 117, the asset(s) 112 for which printed ID tag-bearing labels 111 should be created.

When the user wants to create a printed ID tag-bearing label 111 for a particular asset 112, the user can provide user input, via the GUI 117, to cause this to occur. More specifically, the user can provide user input that selects the asset 112 and requests the creation of a printed ID tag-bearing label 111 for the asset 112.

In response to receiving this user input, the label printing program 110 can send asset information 113 corresponding to the selected assets 112 to the printing system 102. The label printing program 110 can also send one or more commands to the printing system 102. Broadly speaking, the command(s) sent by the label printing program 110 can cause the printing system 102 to do two things. First, the command(s) sent by the label printing program 110 can cause the printing system 102 to read an ID tag 104 from an unprinted ID tag-bearing label 103, determine the UID 105 that is associated with the ID tag 104, and send the UID 105 back to the label printing program 110. Second, the command(s) sent by the label printing program 110 can also cause the printing system 102 to print relevant asset information 113 corresponding to the asset 112 on the unprinted ID tag-bearing label 103, thereby creating a printed ID tag-bearing label 111 that can be affixed to the asset 112.

In response to receiving the UID 105 from the printing system 102, the label printing program 110 can update the asset definition file 116, thereby creating an updated asset definition file 116'. More specifically, the label printing program 110 can update the data record 114 that is associated with the asset 112 for which the printed ID tag-bearing label 111 is being created, thereby creating an updated data record 114'. The updated data record 114' can include both the asset information 113 corresponding to the asset 112 as well as the UID 105 that is received back from the printing system 102. This UID 105 is associated with the ID tag 104 on the unprinted ID tag-bearing label 103 that is being used to create the printed ID tag-bearing label 111 for the asset 112.

Thus, when a printed ID tag-bearing label 111 is created for an asset 112, the UID 105 corresponding to the ID tag 104 in the printed ID tag-bearing label 111 can be associated with the relevant asset information 113 in the asset definition file 116. Advantageously, the association of the UID 105 and the relevant asset information 113 can occur automatically. In other words, once the user has provided user input that selects the asset 112 and requests the creation of a printed ID tag-bearing label 111 for the asset 112, the association of the UID 105 and the relevant asset information 113 can occur without any additional actions being taken by the user. More specifically, once the user has provided user input that selects the asset 112 and requests the creation of a printed ID tag-bearing label 111 for the asset 112, the label printing program 110 can take whatever actions are necessary to cause the UID 105 to be associated with the asset information 113 (e.g., send command(s) to the printing system 102 that cause the ID tag reader 107 to read the ID tag 104 and determine the UID 105, receive the UID 105 from the printing system 102, and update the data record 114 in the asset definition file 116 to create an updated data record 114' in an updated asset definition file 116') without any additional actions being taken by the user.

In addition, the printing system 102 can perform the acts of reading the ID tag 104 from the unprinted ID tag-bearing label 103 and communicating the UID 105 to the label printing program 110 at substantially the same time as the act of printing the asset information 113 on the unprinted ID tag-bearing label 103. Thus, the data record 114 can be updated with the UID 105 associated with the ID tag 104 at substantially the same time as the relevant asset information 113 is printed on the unprinted ID tag-bearing label 103 comprising the ID tag 104. This is beneficial because it helps to ensure that the UID 105 is associated with the correct asset 112 in the asset definition file 116. More specifically, reading the ID tag 104 at about the same time as the printed ID tag-bearing label 111 is being created helps to ensure that the UID 105 corresponding to the ID tag 104 is added to the data record 114 that corresponds to the asset 112 for which the printed ID tag-bearing label 111 is being created.

The term "substantially" in the foregoing paragraph should be interpreted to mean "to a great extent or degree." In some embodiments, two events occur at substantially the same time if they occur within one minute of each other. In other embodiments, two events occur at substantially the same time if they occur within five minutes of each other. In other embodiments, two events occur at substantially the same time if they occur within thirty minutes of each other. In other embodiments, two events occur at substantially the same time if they occur within one hour of each other. In other embodiments, two events occur at substantially the same time if they occur within one day of each other.

For simplicity and clarity, the example that was just described focused on the creation of a single printed ID tag-bearing label 111 for a single asset 112. However, the system 100 shown in FIG. 1 can be utilized to create printed ID tag-bearing labels 111 for a large number of assets 112. More specifically, the process described above in relation to the creation of a single printed ID tag-bearing label 111 for a single asset 112 can be repeated each time a new printed ID tag-bearing label 111 is created. When printed ID tag-bearing labels 111 are created for a large number of assets 112, the label printing program 110 can cause the printing system 102 to read the UIDs 105 corresponding to the ID tags 104 in the unprinted ID tag-bearing labels 103 and associate those UIDs 105 with the relevant asset information 113 as the printed ID tag-bearing labels 111 are created.

In some embodiments, the ID tag-bearing labels 103 can be arranged in a particular sequence, and the ID tag-bearing labels 103 can be provided to the printing mechanism 106 in the printing system 102 in sequential order based on the sequence. In such embodiments, when the ID tag reader 107 receives a command to read an ID tag 104, the ID tag reader 107 can read the ID tag 104 corresponding to the next unprinted ID tag-bearing label 103 in the sequence.

For example, in some embodiments there can be a roll of unprinted ID tag-bearing labels 103 that is provided to the printing mechanism 106 in the printing system 102. In this context, the term "roll" can refer to a quantity of ID tag-bearing labels 103 that are rolled up into a generally cylindrical shape. In such embodiments, when the ID tag reader 107 receives a command to read an ID tag 104, the ID tag reader 107 can read the ID tag 104 corresponding to the next unprinted ID tag-bearing label 103 in the roll of unprinted ID tag-bearing labels 103.

In some embodiments, the computing system 101 can be operated by a supplier of the assets 112 and the asset definition file 116 can be received from a purchasing entity that is going to purchase the assets 112 from the supplier. In such embodiments, the supplier can send the updated asset definition file 116' back to the purchasing entity.

For example, consider an embodiment in which the assets 112 are electronic cables for use in datacenters. The asset definition file 116 can include information about all of the electronic cables that the purchasing entity is ordering from the supplier. Once the asset definition file 116 has been updated to include UIDs 105 corresponding to the printed ID tag-bearing labels 111 that have been created and affixed (or that will be affixed) to the electronic cables, the supplier can send the updated asset definition file 116' back to the purchasing entity so that the purchasing entity can have and use this information with respect to the electronic cables that are being ordered.

Figure 2:
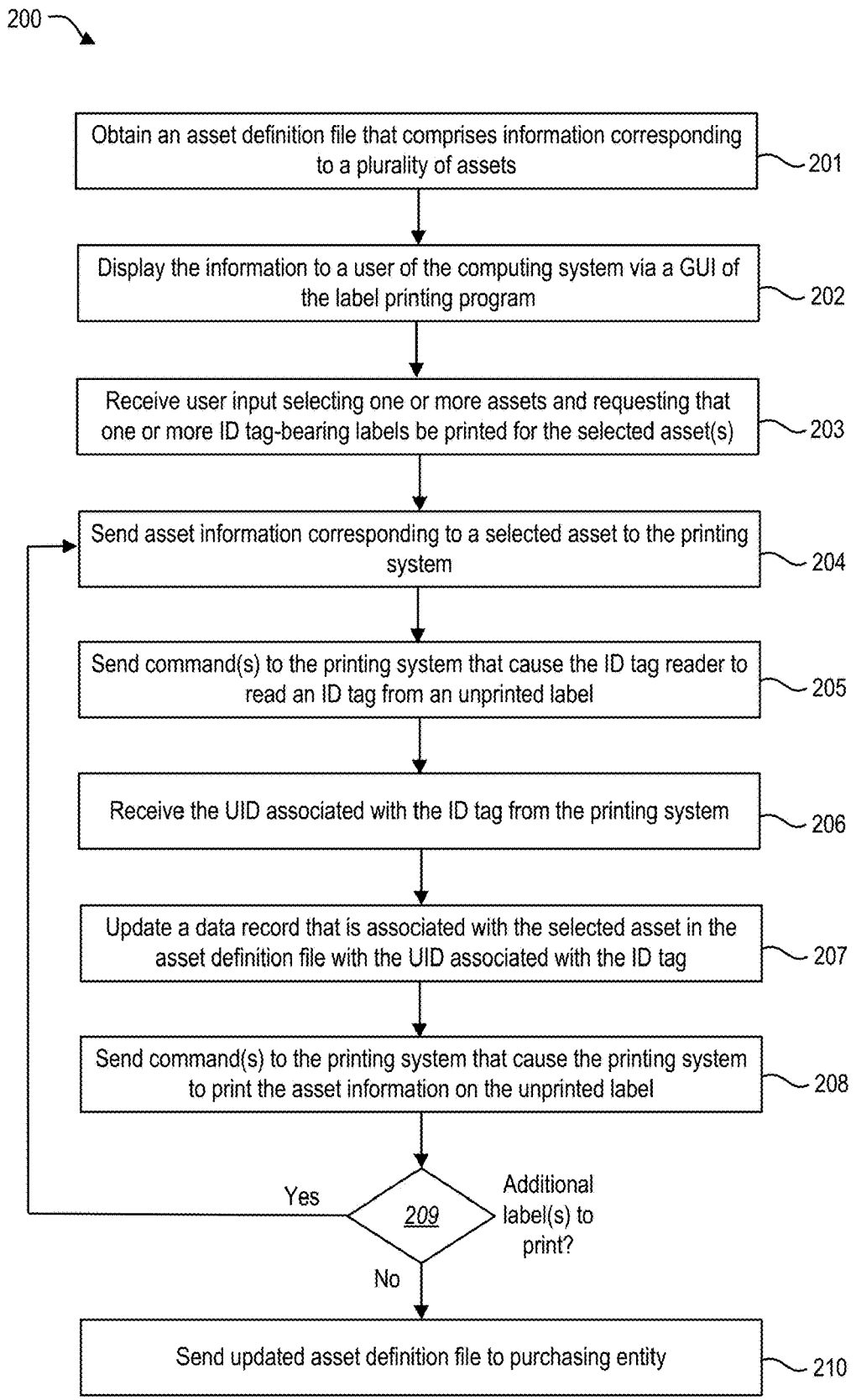
FIG. 2 illustrates an example of a method for associating assets with UIDs corresponding to ID tag-bearing labels that are designed to be affixed to the assets.

FIG. 2 illustrates an example of a method 200 for associating assets 112 with UIDs 105 corresponding to ID tag-bearing labels 103 that are designed to be affixed to the assets 112. The method 200 will be described in relation to the system 100 that is shown in FIG. 1. The method 200 can be implemented by the label printing program 110 that is running on the computing system 101.

At 201, the label printing program 110 can obtain an asset definition file 116 that comprises asset information 113 corresponding to a plurality of different assets 112. As discussed above, in some embodiments the computing system 101 can be operated by a supplier of the assets 112 and the asset definition file 116 can be received from a purchasing entity that is going to purchase the assets 112 from the supplier.

At 202, the label printing program 110 can display the asset information 113 to a user of the computing system 101. The asset information 113 can be displayed via a GUI 117 of the label printing program 110.

At 203, the label printing program 110 can receive user input selecting one or more assets 112 and requesting that one or more ID tag-bearing labels 103 be printed for each selected asset 112. This user input can be received via the GUI 117. In some embodiments, one ID tag-bearing label 103 can be printed for each selected asset 112. In other embodiments, more than one ID tag-bearing label 103 can be printed for at least some of the selected assets 112.

At 204, in response to receiving the user input at 203, the label printing program 110 can send asset information 113 corresponding to a selected asset 112 to the printing system 102. In some embodiments, the label printing program 110 can send the asset information 113 that is supposed to be printed on the ID tag-bearing label 103 in order to create the printed ID tag-bearing label 111 for the asset 112.

At 205, the label printing program 110 can send one or more commands to the printing system 102 that cause the ID tag reader 107 in the printing system 102 to read an ID tag 104 from an unprinted ID tag-bearing label 103 and determine the UID 105 associated with the ID tag 104. The printing system 102 can send the UID 105 back to the label printing program 110. As noted above, in some embodiments, the ID tag-bearing labels 103 can be arranged in a particular sequence (e.g., there can be a roll of ID tag-bearing labels 103). In such embodiments, the ID tag reader 107 can read the ID tag 104 corresponding to the next unprinted ID tag-bearing label 103 in the sequence (e.g., the next ID tag-bearing label 103 on the roll).

At 206, the label printing program 110 can receive the UID 105 associated with the ID tag 104 from the printing system 102. At 207, the label printing program 110 can update a data record 114 that is associated with the selected asset 112 in the asset definition file 116 with the UID 105 associated with the corresponding ID tag 104. This has the effect of creating an updated asset definition file 116' with an updated data record 114' that includes both (i) the asset information 113 corresponding to the selected asset 112, and (ii) the UID 105 associated with the ID tag 104 on the ID tag-bearing label 103 that is (or will be) affixed to the selected asset 112.

At 208, the label printing program 110 can send one or more commands to the printing system 102 that cause the printing system 102 to print the asset information 113 corresponding to the selected asset 112 on the unprinted ID tag-bearing label 103 whose ID tag 104 was read by the ID tag reader 107 in response to the command(s) sent at 205.

At 209, a determination can be made about whether there are additional assets 112 for which printed ID tag-bearing labels 111 should be created. If there is at least one additional asset 112 for which a printed ID tag-bearing label 111 should be created, the method 200 can return to 204 and proceed as described above. However, if there are not any additional assets 112 for which printed ID tag-bearing labels 111 should be created, then at 210 the updated asset definition file 116' can be provided to the entity that initially created the asset definition file 116. For example, in embodiments where the asset definition file 116 is received from a purchasing entity that is going to purchase the assets 112, the updated asset definition file 116' can be sent to the purchasing entity.

In some embodiments, acts 204, 205, and 208 can be performed simultaneously. In other words, the label printing program 110 can send the asset information 113 referenced in act 204 and the command(s) referenced in acts 205 and 208 to the printing system 102 as part of the same transmission. Alternatively, in other embodiments, at least some of acts 204, 205, and 208 can be performed separately. For example, the label printing program 110 can send the asset information 113 referenced in act 204 and the command(s) referenced in acts 205 and 208 to the printing system 102 in different transmissions.

In some embodiments, the command(s) referenced in act 205 can be separate and distinct from the command(s) referenced in act 208. Alternatively, in other embodiments, the same command(s) that cause the ID tag reader 107 to read the ID tag 104 (act 205) can also cause the printing system 102 to print the asset information 113 (act 208). In other words, in some embodiments, the label printing program 110 can send the same set of one or more commands to the printing system 102 to cause both (i) the ID tag reader 107 to read the ID tag 104 (act 205) and (ii) the printing system 102 to print the asset information 113 (act 208).

In some embodiments, the user input referenced in act 203 could select a single asset 112. Alternatively, the user input could instead select a plurality of different assets 112. In a case where the user input selects a plurality of different assets 112, acts 204 through 208 of the method 200 can be repeated for each selected asset 112. Thus, if the user selects N different assets 112 (where the value of N can be any integer that is greater than or equal to zero), acts 204 through 208 of the method 200 can be repeated N times. This would cause N different printed ID tag-bearing labels 111 to be created, one for each of the N assets. Moreover, the UIDs 105 associated with the ID tags 104 corresponding to these N different printed ID tag-bearing labels 111 can be associated with the corresponding asset information 113 in the updated asset definition file 116'.

Figure 3A:
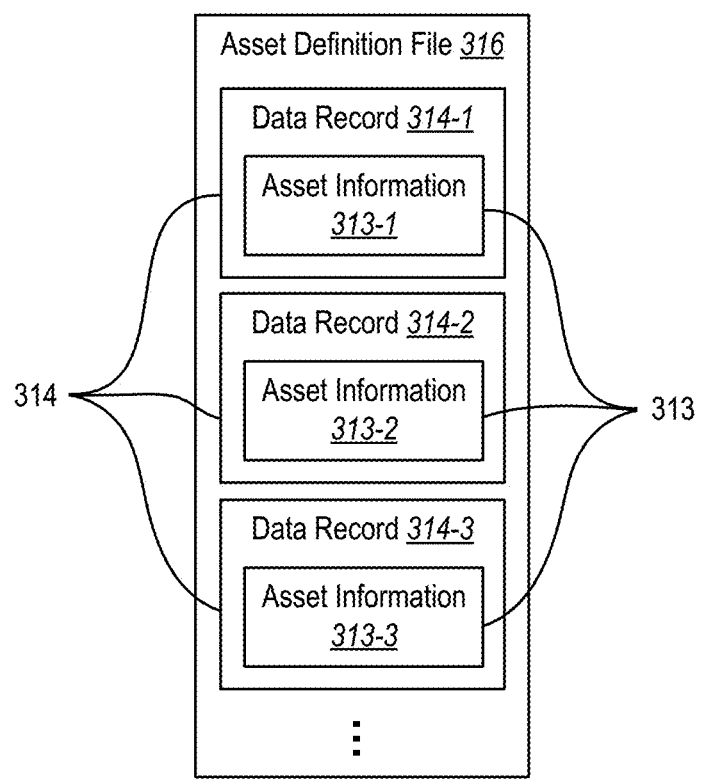
FIG. 3A illustrates an example of an asset definition file.

An example will now be described in connection with FIGS. 3A-3D. FIG. 3A shows an asset definition file 316. The asset definition file 316 includes asset information 313 corresponding to a plurality of different assets 312 (which are shown in FIG. 3C). In the depicted example, the asset information 313 corresponding to a particular asset 312 is included in a data record 314 that corresponds to that asset 312. Thus, data record 314-1 includes asset information 313-1 corresponding to asset 312-1, data record 314-2 includes asset information 313-2 corresponding to asset 312-2, data record 314-3 includes asset information 313-3 corresponding to asset 312-3, and so forth.

The asset definition file 316 is an example of the asset definition file 116 in the system 100 shown in FIG. 1. The asset definition file 316 can be provided to a computing system 101 that includes a label printing program 110 running on the computing system 101. The label printing program 110 can parse the asset definition file 316 to determine the asset information 313. The label printing program 110 can then display the asset information 313 to a user of the computing system 101. When a user wants to create printed ID tag-bearing labels 311 (shown in FIG. 3D) for one or more assets 312, the label printing program 110 can receive user input selecting the asset(s) 312 and requesting that a printed ID tag-bearing label 311 be created for each selected asset 312. For purposes of the present example, it will be assumed that the user input selects each of the assets 312-1, 312-2, 312-3 by selecting the corresponding asset information 313-1, 313-2, 313-3 that is displayed to the user via the GUI 117 of the label printing program 110. It will also be assumed that the user input requests that printed ID tag-bearing labels 311-1, 311-2, 311-3 be created for the assets 312-1, 312-2, 312-3.

Figure 3B:
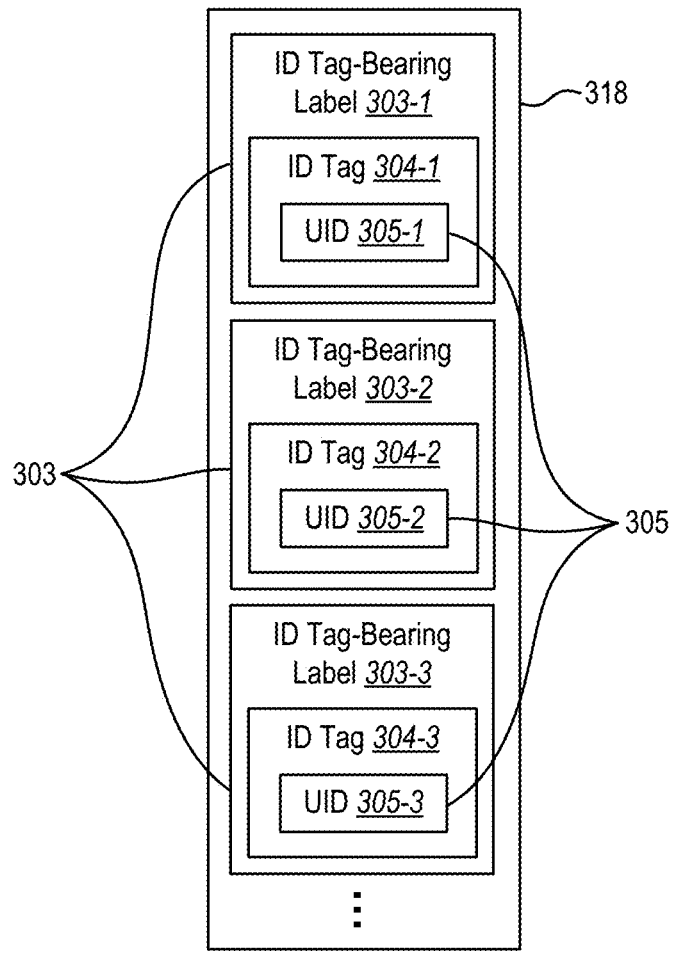
FIG. 3B illustrates a plurality of unprinted ID tag-bearing labels.
Figure 3C:
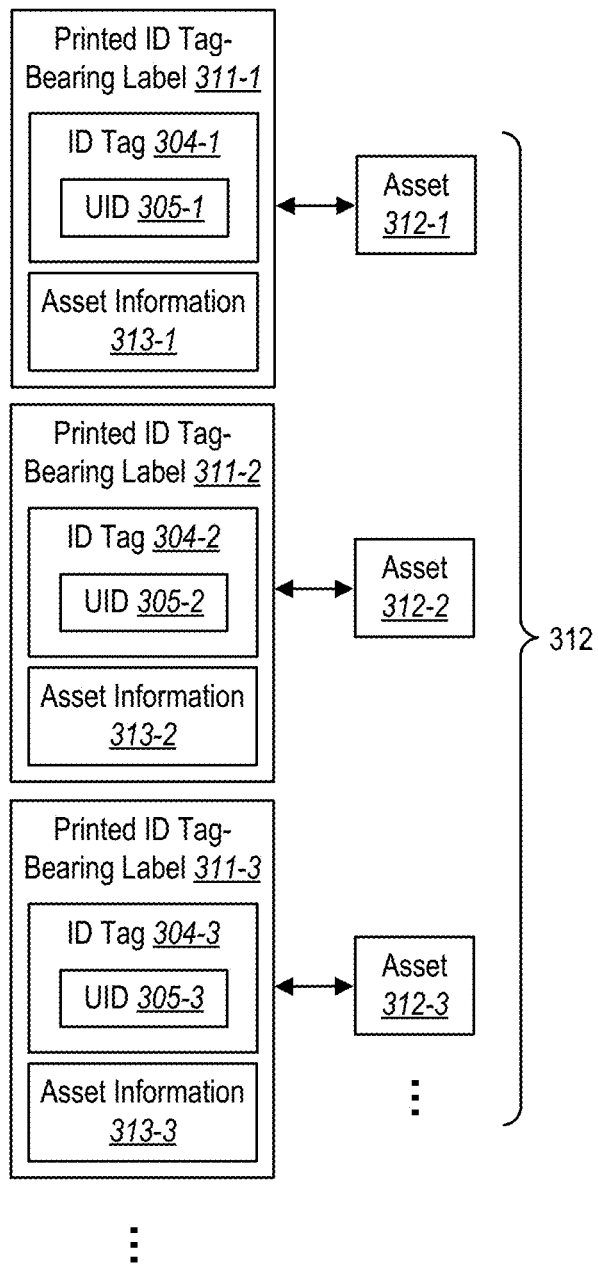
FIG. 3C illustrates a plurality of printed ID tag-bearing labels and a plurality of assets.

FIG. 3B shows a plurality of unprinted ID tag-bearing labels 303 that can be used to create the printed ID tag-bearing labels 311 shown in FIG. 3C. In particular, FIG. 3B shows unprinted ID tag-bearing label 303-1, unprinted ID tag-bearing label 303-2, and unprinted ID tag-bearing label 303-3. Unprinted ID tag-bearing label 303-1 includes ID tag 304-1 having UID 305-1. Unprinted ID tag-bearing label 303-2 includes ID tag 304-2 having UID 305-2. Unprinted ID tag-bearing label 303-3 includes ID tag 304-3 having UID 305-3.

For purposes of the present example, it will be assumed that the unprinted ID tag-bearing labels 303 are arranged so that they are provided to and printed by the printing system 102 in a particular sequence. More specifically, the unprinted ID tag-bearing labels 303 can be mounted or otherwise affixed to some type of physical structure 318, and the unprinted ID tag-bearing labels 303 can be provided to and printed by the printing system 102 in the order in which they are arranged on that physical structure 318. In some embodiments, the physical structure 318 can include a sheet of material. The unprinted ID tag-bearing labels 303 can be mounted or otherwise affixed to this sheet of material in the sequence shown in FIG. 3B (the ID tag-bearing label 303-1 is first, followed by the ID tag-bearing label 303-2, followed by the ID tag-bearing label 303-3, and so forth). In some embodiments, the physical structure 318 (e.g., sheet of material) can be rolled up into a generally cylindrical shape, such that the ID tag-bearing labels 303 are formed into a "roll" of ID tag-bearing labels 303-3.

FIG. 3C shows a plurality of printed ID tag-bearing labels 311 and a plurality of assets 312. The label printing program 110 running on the computing system 101 can cause the printing system 102 to create the printed ID tag-bearing labels 311 for the assets 312 by printing asset information 313 on the ID tag-bearing labels 303. In some embodiments, the printed ID tag-bearing labels 311 can be created one at a time. In other words, the printed ID tag-bearing label 311-1 can initially be created for the asset 312-1, then the printed ID tag-bearing label 311-2 can be created for the asset 312-2, then the printed ID tag-bearing label 311-3 can be created for the asset 312-3, and so forth.

Initially, the label printing program 110 can cause the printing system 102 to print asset information 313-1 corresponding to the asset 312-1 on the first ID tag-bearing label 303-1 on the physical structure 318 and thereby create the printed ID tag-bearing label 311-1 for the asset 312-1. More specifically, the label printing program 110 can send the asset information 313-1 corresponding to the asset 312-1 to the printing system 102. The label printing program 110 can also send one or more commands to the printing system 102 that (i) cause the ID tag reader 107 to read the ID tag 304-1 that is associated with the ID tag-bearing label 303-1 and determine the UID 305-1 that is associated with the ID tag 304-1, (ii) cause the printing system 102 to send the UID 305-1 back to the label printing program 110, and (iii) cause the printing system 102 to print the asset information 313-1 on the ID tag-bearing label 303-1 to thereby create the printed ID tag-bearing label 311-3 that can be affixed to the asset 312-1.

Figure 3D:
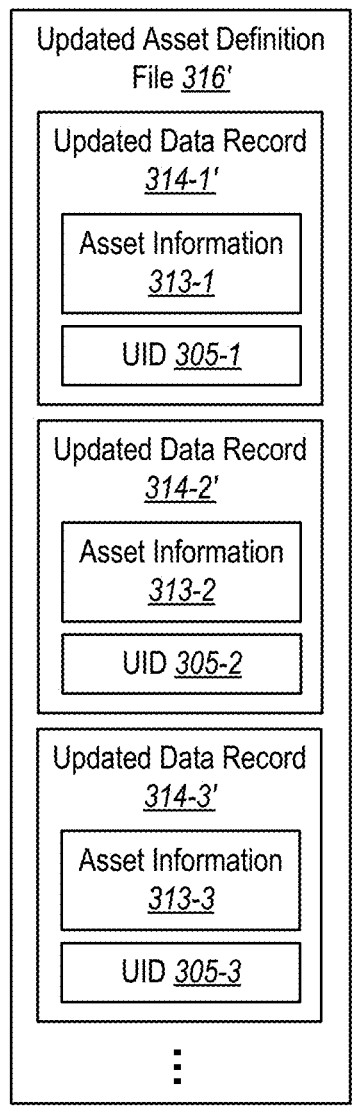
FIG. 3D illustrates a plurality of printed ID tag-bearing labels.

When the label printing program 110 receives the UID 305-1 from the printing system 102, the label printing program 110 can update the data record 314-1 associated with the asset 312-1 to include the UID 305-1. This creates an updated asset definition file 316', which is shown in FIG. 3D. The updated asset definition file 316' includes an updated data record 314-1' having both the asset information 313-1 and the UID 305-1.

Next, the label printing program 110 can cause the printing system 102 to print asset information 313-2 corresponding to the asset 312-2 on the next ID tag-bearing label 303-2 on the physical structure 318 and thereby create the printed ID tag-bearing label 311-2 for the asset 312-2. More specifically, the label printing program 110 can send the asset information 313-2 corresponding to the asset 312-2 to the printing system 102. The label printing program 110 can also send one or more commands to the printing system 102 that (i) cause the ID tag reader 107 to read the ID tag 304-2 that is associated with the ID tag-bearing label 303-2 and determine the UID 305-2 that is associated with the ID tag 304-2, (ii) cause the printing system 102 to send the UID 305-2 back to the label printing program 110, and (iii) cause the printing system 102 to print the asset information 313-2 on the ID tag-bearing label 303-2 to thereby create the printed ID tag-bearing label 311-2 that can be affixed to the asset 312-2.

When the label printing program 110 receives the UID 305-2 from the printing system 102, the label printing program 110 can update the data record 314-2 associated with the asset 312-2 to include the UID 305-2. Thus, the updated asset definition file 316' shown in FIG. 3D includes an updated data record 314-2' having both the asset information 313-2 and the UID 305-2.

Next, the label printing program 110 can cause the printing system 102 to print asset information 313-3 corresponding to the asset 312-3 on the next ID tag-bearing label 303-3 on the physical structure 318 and thereby create the printed ID tag-bearing label 311-3 for the asset 312-3. More specifically, the label printing program 110 can send the asset information 313-3 corresponding to the asset 312-3 to the printing system 102. The label printing program 110 can also send one or more commands to the printing system 102 that (i) cause the ID tag reader 107 to read the ID tag 304-3 that is associated with the ID tag-bearing label 303-3 and determine the UID 305-3 that is associated with the ID tag 304-3, (ii) cause the printing system 102 to send the UID 305-3 back to the label printing program 110, and (iii) cause the printing system 102 to print the asset information 313-3 on the ID tag-bearing label 303-3 to thereby create the printed ID tag-bearing label 311-3 that can be affixed to the asset 312-3.

When the label printing program 110 receives the UID 305-3 from the printing system 102, the label printing program 110 can update the data record 314-3 associated with the asset 312-3 to include the UID 305-3. Thus, the updated asset definition file 316' shown in FIG. 3D includes an updated data record 314-3' having both the asset information 313-3 and the UID 305-3.

In some embodiments, the label printing program 110 can send asset information 313 and command(s) to the printing system 102 for one asset 312 at a time. In addition, whenever the ID tag reader 107 reads an ID tag-bearing label 303 and determines a UID 305 associated with the ID tag-bearing label 303, the printing system 102 can immediately send the UID 305 back to the computing system 101 and the label printing program 110 can immediately associate the UID 305 with the corresponding asset information 313 in the asset definition file 316. An example of this type of approach is illustrated in the method 400 shown in FIG. 4.

At 401, the label printing program 110 sends the asset information 313-1 corresponding to the asset 312-1 to the printing system 102 along with command(s) that cause the printing system 102 to, at 402, read the ID tag 304-1 associated with the next unprinted ID tag-bearing label 303-1 and determine the UID 305-1 associated with that ID tag 304-1. After reading the ID tag 304-1, the printing system 102 can, at 403, send the UID 305-1 back to the computing system 101. In response to receiving the UID 305-1, the label printing program 110 can, at 404, associate the UID 305-1 with the asset information 313-1 in the data record 314-1 corresponding to the asset 312-1. At 405, the command(s) sent by the label printing program 110 can also cause the printing system 102 to print the asset information 313-1 on the ID tag-bearing label 303-1 to create the printed ID tag-bearing label 311-1.

Next, at 406, the label printing program 110 sends the asset information 313-2 corresponding to the asset 312-2 to the printing system 102 along with command(s) that cause the printing system 102 to, at 407, read the ID tag 304-2 associated with the next unprinted ID tag-bearing label 303-2 and determine the UID 305-2 associated with that ID tag 304-2. After reading the ID tag 304-2, the printing system 102 can, at 408, send the UID 305-2 back to the computing system 101. In response to receiving the UID 305-2, the label printing program 110 can, at 409, associate the UID 305-2 with the asset information 313-2 in the data record 314-2 corresponding to the asset 312-2. At 410, the command(s) sent by the label printing program 110 can also cause the printing system 102 to print the asset information 313-2 on the ID tag-bearing label 303-2 to create the printed ID tag-bearing label 311-2.

Next, at 411, the label printing program 110 sends the asset information 313-3 corresponding to the asset 312-3 to the printing system 102 along with command(s) that cause the printing system 102 to, at 412, read the ID tag 304-3 associated with the next unprinted ID tag-bearing label 303-3 and determine the UID 305-3 associated with that ID tag 304-3. After reading the ID tag 304-3, the printing system 102 can, at 413, send the UID 305-3 back to the computing system 101. In response to receiving the UID 305-3, the label printing program 110 can, at 414, associate the UID 305-3 with the asset information 313-3 in the data record 314-3 corresponding to the asset 312-3. At 415, the command(s) sent by the label printing program 110 can also cause the printing system 102 to print the asset information 313-3 on the ID tag-bearing label 303-3 to create the printed ID tag-bearing label 311-3.

Figure 4:
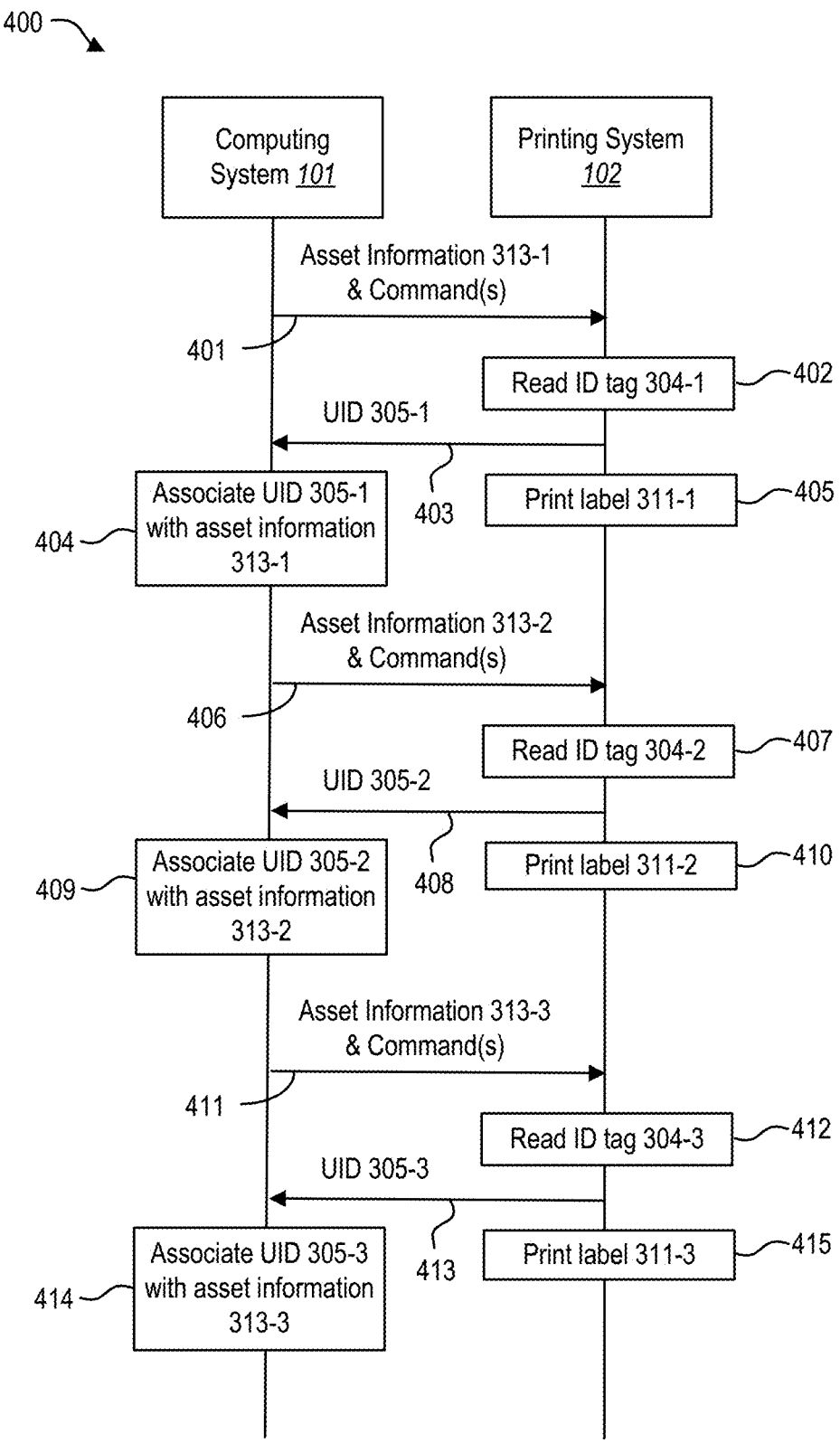
FIG. 4 illustrates one possible way that the unprinted ID tag-bearing labels can be printed to form the printed ID tag-bearing labels shown in FIG. 3D.
Figure 5:
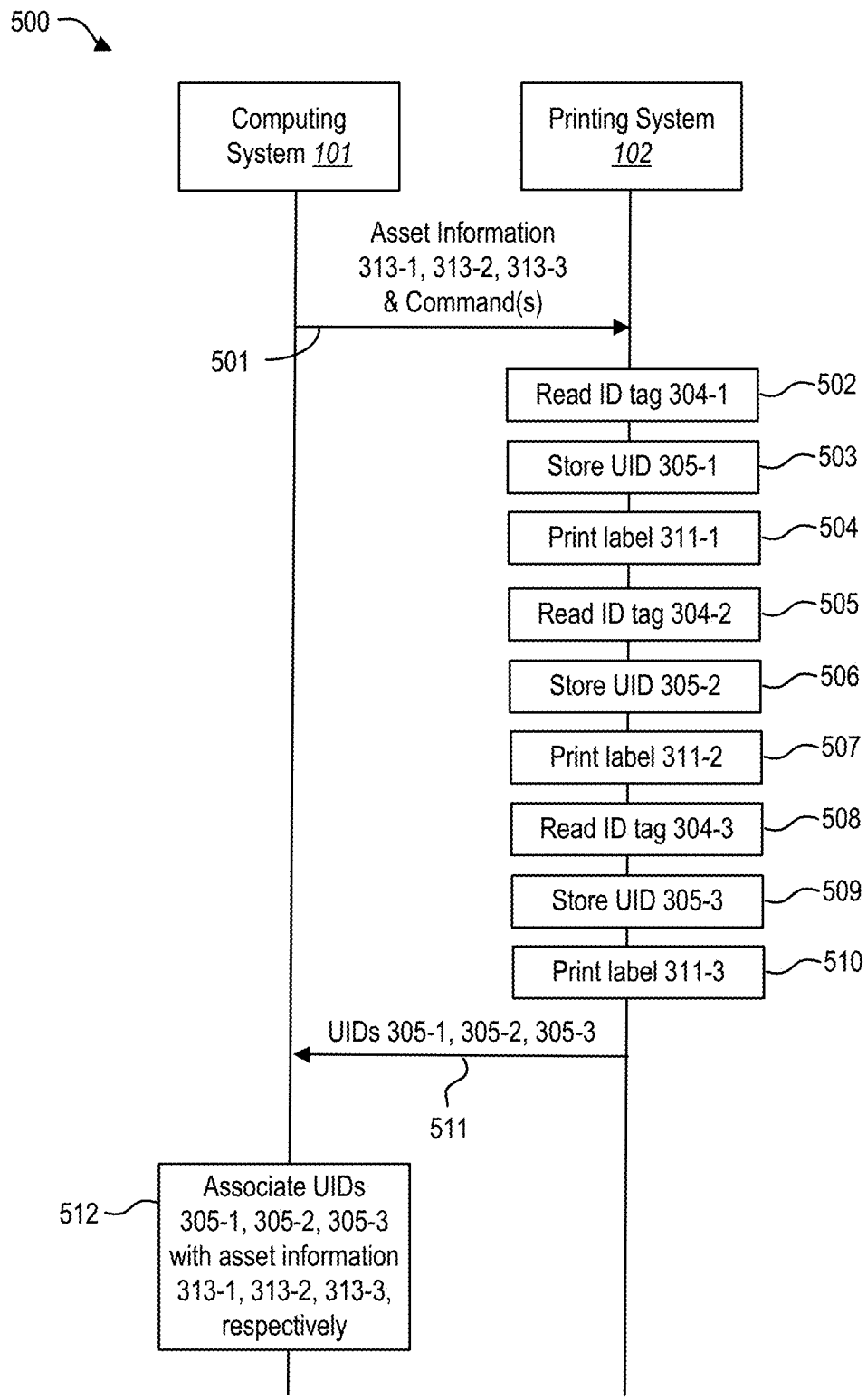
FIG. 5 illustrates another possible way that the unprinted ID tag-bearing labels can be printed to form the printed ID tag-bearing labels shown in FIG. 3D.

As an alternative to the method 400 shown in FIG. 4, the label printing program 110 can instead send asset information 313 and command(s) to the printing system 102 for a plurality of different assets 312 at a time. In addition, the printing system 102 can store a plurality of UIDs 305, at least temporarily, and send the plurality of UIDs 305 back to the computing system 101 all at once. An example of this type of approach is illustrated in the method 500 shown in FIG. 5.

At 501, the label printing program 110 sends the asset information 313-1, 313-2, 313-3 corresponding to the assets 312-1, 312-2, 312-3 to the printing system 102 along with command(s) to perform various operations.

At 502, the command(s) sent by the label printing program 110 cause the ID tag reader 107 to read the ID tag 304-1 associated with the next unprinted ID tag-bearing label 303-1 and determine the UID 305-1 associated with that ID tag 304-1. At 503, the UID 305-1 is stored in memory at the printing system 102. At 504, the command(s) sent by the label printing program 110 cause the printing system 102 to print the asset information 313-1 on the ID tag-bearing label 303-1 to create the printed ID tag-bearing label 311-1.

At 505, the command(s) sent by the label printing program 110 cause the ID tag reader 107 to read the ID tag 304-2 associated with the next unprinted ID tag-bearing label 303-2 and determine the UID 305-2 associated with that ID tag 304-2. At 506, the UID 305-2 is stored in memory at the printing system 102. At 507, the command(s) sent by the label printing program 110 cause the printing system 102 to print the asset information 313-2 on the ID tag-bearing label 303-2 to create the printed ID tag-bearing label 311-2.

At 508, the command(s) sent by the label printing program 110 cause the ID tag reader 107 to read the ID tag 304-3 associated with the next unprinted ID tag-bearing label 303-3 and determine the UID 305-3 associated with that ID tag 304-3. At 509, the UID 305-3 is stored in memory at the printing system 102. At 510, the command(s) sent by the label printing program 110 cause the printing system 102 to print the asset information 313-3 on the ID tag-bearing label 303-3 to create the printed ID tag-bearing label 311-3.

At 511, the printing system 102 sends the UIDs 305-1, 305-2, 305-3 back to the computing system 101. At 512, in response to receiving the UIDs 305-1, 305-2, 305-3, the label printing program 110 associates the UIDs 305-1, 305-2, 305-3 with the asset information 313-1, 313-2, 313-3 in the data records 314-1, 314-2, 314-3 corresponding to the assets 312-1, 312-2, 312-3.

Figure 6:
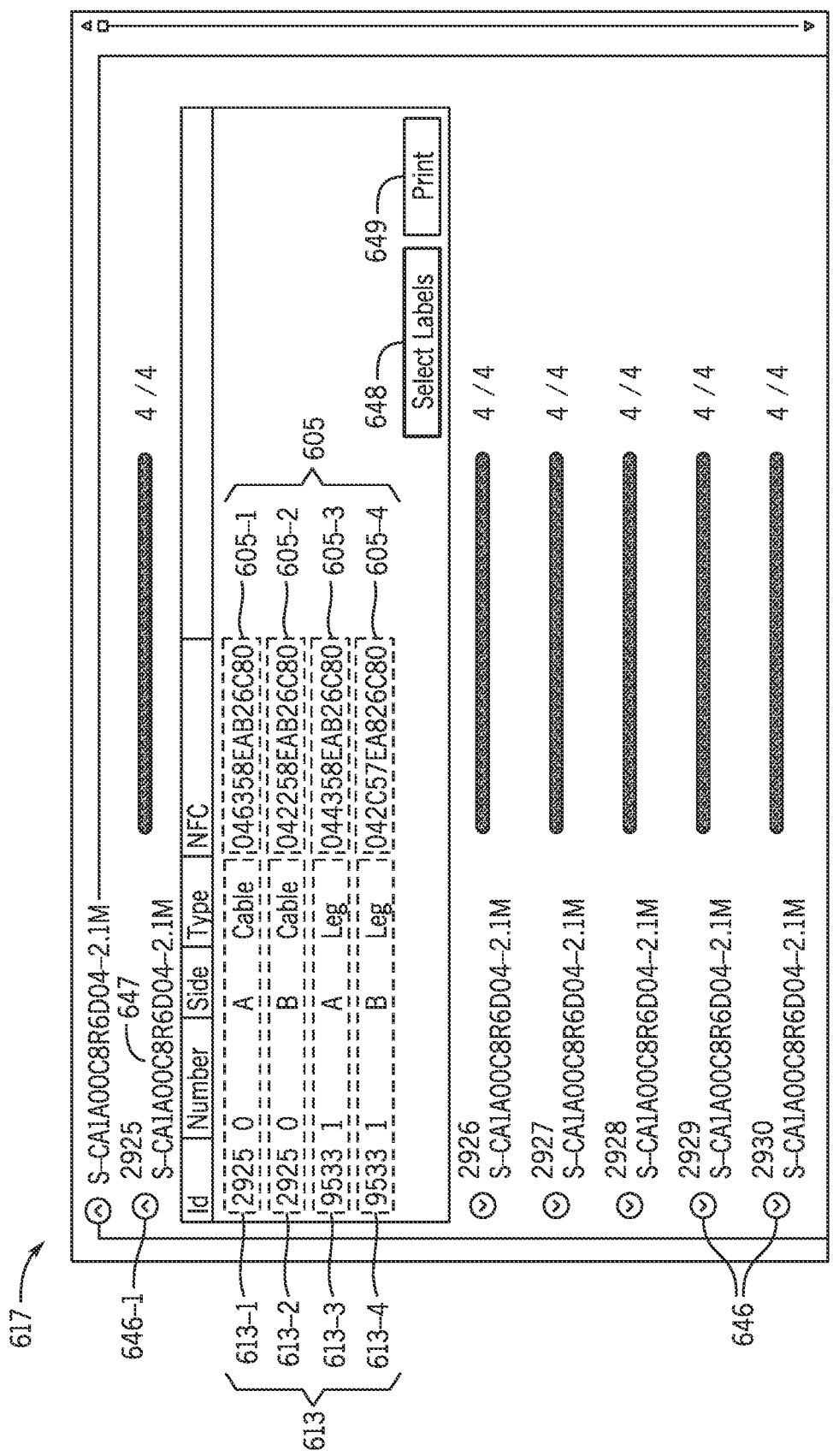
FIG. 6 illustrates an example of a GUI that can be utilized by the label printing program shown in FIG. 1.

FIG. 6 illustrates an example of a GUI 617 that can be utilized by the label printing program 110. More specifically, FIG. 6 illustrates an example showing one way that the label printing program 110 can display asset information 613 to a user of the computing system 101.

The GUI 617 shown in FIG. 6 includes a plurality of user interface (UI) elements 646. Each UI element 646 is associated with a particular asset 112. In the depicted example, the UI element 646-1 located in the top portion of the GUI 617 has been activated. This UI element 646-1 is associated with an asset that corresponds to an identifier (ID) 647, which is displayed to the user via the GUI 617.

In response to activation of the UI element 646-1, asset information 613 associated with the corresponding asset 112 is displayed to the user. In the depicted example, a plurality of different printed ID tag-bearing labels 111 are created for the asset 112 corresponding to the UI element 646-1 and the ID 647. These printed ID tag-bearing labels 111 are designed to be affixed to different parts of the asset 112.

The GUI 617 displays asset information 613 and a UID 605 for each printed ID tag-bearing label 111 that is created. More specifically, the GUI 617 displays asset information 613-1 and UID 605-1 corresponding to a first printed ID tag-bearing label 111, asset information 613-2 and UID 605-2 corresponding to a second printed ID tag-bearing label 111, asset information 613-3 and UID 605-3 corresponding to a third printed ID tag-bearing label 111, and asset information 613-4 and UID 605-4 corresponding to a third printed ID tag-bearing label 111.

FIG. 6 shows the GUI 617 after the UIDs 605 have been read from the unprinted ID tag-bearing labels 103. When the GUI 617 is initially displayed to the user, the GUI 617 does not include the UIDs 605 because they have not yet been determined. When the user causes the printed ID tag-bearing labels 111 to be created (e.g., by activating the UI elements 648, 649), the ID tag reader 107 determines the UIDs 605 in the manner described above. The asset definition file 116 is updated to include the UIDs 605, and the UIDs 605 are then displayed to the user via the GUI 617.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for associating assets with unique identifiers (UIDs) corresponding to identification (ID) tag-bearing labels that are designed to be affixed to the assets, comprising:
 a printing system comprising an ID tag reader; and
 a computing system operated by a supplier of a plurality of assets and communicatively coupled to the printing system, the computing system comprising a processor, memory communicatively coupled to the processor, and instructions stored in the memory, the instructions being executable by the processor to:
  receive an asset definition file from a purchasing entity that will purchase the plurality of assets from the supplier, wherein the asset definition file comprises information corresponding to the plurality of assets;
  display the information to a user of the computing system;
  receive user input selecting an asset and requesting that an ID tag-bearing label be printed for the selected asset;
  send one or more commands to the printing system in response to receiving the user input, the one or more commands causing the ID tag reader in the printing system to read an ID tag from an unprinted label and thereby determine a UID associated with the ID tag, the ID tag being selected from the group consisting of a near-field communication (NFC) tag and a radio frequency identification (RFID) tag, and the one or more commands additionally causing the printing system to print asset information corresponding to the selected asset on the unprinted label to thereby create a printed label that can be affixed to the asset;
  receive the UID associated with the ID tag from the printing system;
  in response to receiving the UID, update a data record that is associated with the selected asset in the asset definition file with the UID associated with the ID tag; and
  send the plurality of assets and an updated asset definition file comprising the updated data record to the purchasing entity.

2. The system of claim 1, wherein the data record is updated with the UID associated with the ID tag at substantially the same time as the asset information is printed on the unprinted label comprising the ID tag.

3. The system of claim 1, wherein the instructions are executable by the processor to automatically send the one or more commands to the printing system, automatically receive the UID associated with the ID tag from the printing system, and automatically update the data record that is associated with the asset in the asset definition file in response to receiving the user input.

4. The system of claim 1, wherein:
 the printing system is configured so that a plurality of unprinted ID tag-bearing labels are arranged in a sequence;
 the plurality of unprinted ID tag-bearing labels are provided to a printing mechanism within the printing system in sequential order based on the sequence; and
 the ID tag reader reads the ID tag from a next unprinted label in the sequence.

5. The system of claim 1, wherein the instructions are additionally executable by the processor to:
 obtain the asset information that is to be printed on the unprinted label from the asset definition file; and
 send the asset information that is to be printed on the unprinted label to the printing system.

6. A computing system that is configured to associate assets with unique identifiers (UIDs) corresponding to identification (ID) tag-bearing labels that are designed to be affixed to the assets, the computing system being operated by a supplier of a plurality of assets, and the computing system being communicatively coupled to a printing system comprising an ID tag reader, the computing system comprising:
 a processor;
 memory communicatively coupled to the processor; and
 instructions stored in the memory, the instructions being executable by the processor to:
  receive an asset definition file from a purchasing entity that will purchase the plurality of assets from the supplier, wherein the asset definition file comprises information corresponding to the plurality of assets;
  display the information to a user of the computing system;
  receive user input selecting an asset and requesting that an ID tag-bearing label be printed for the selected asset;
  send one or more commands to the printing system in response to receiving the user input, the one or more commands causing the ID tag reader in the printing system to read an ID tag from an unprinted label and thereby determine a UID associated with the ID tag, the ID tag being selected from the group consisting of a near-field communication (NFC) tag and a radio frequency identification (RFID) tag, and the one or more commands additionally causing the printing system to print asset information corresponding to the selected asset on the unprinted label to thereby create a printed label that can be affixed to the asset;
  receive the UID associated with the ID tag from the printing system;
  in response to receiving the UID, update a data record that is associated with the selected asset in the asset definition file with the UID associated with the ID tag; and
  send the plurality of assets and an updated asset definition file comprising the updated data record to the purchasing entity.

7. The computing system of claim 6, wherein the data record is updated with the UID associated with the ID tag at substantially the same time as the asset information is printed on the unprinted label comprising the ID tag.

8. The computing system of claim 6, wherein the instructions are executable by the processor to automatically send the one or more commands to the printing system, automatically receive the UID associated with the ID tag from the printing system, and automatically update the data record that is associated with the asset in the asset definition file in response to receiving the user input.

9. The computing system of claim 6, wherein:
the printing system is configured so that a plurality of unprinted ID tag-bearing labels are arranged in a sequence;
the plurality of unprinted ID tag-bearing labels are provided to a printing mechanism within the printing system in sequential order based on the sequence; and
the ID tag reader reads the ID tag from a next unprinted label in the sequence.

10. The computing system of claim 6, wherein the instructions are additionally executable by the processor to:
obtain the asset information that is to be printed on the unprinted label from the asset definition file; and
send the asset information that is to be printed on the unprinted label to the printing system.

11. A non-transitory computer-readable medium comprising instructions that are executable by at least one processor to cause a computing system to implement a method for associating assets with unique identifiers (UIDs) corresponding to identification (ID) tag-bearing labels that are designed to be affixed to the assets, the computing system being operated by a supplier of a plurality of assets, and the computing system being communicatively coupled to a printing system, the printing system comprising an ID tag reader, the method comprising:
obtaining an asset definition file from a purchasing entity that will purchase the plurality of assets from the supplier, wherein the asset definition file comprises information corresponding to the plurality of assets;
displaying the information to a user of the computing system;
receiving user input selecting an asset and requesting that an ID tag-bearing label be printed for the selected asset;
sending one or more commands to the printing system in response to receiving the user input, the one or more commands causing the ID tag reader in the printing system to read an ID tag from an unprinted label and thereby determine a UID associated with the ID tag, the ID tag being selected from the group consisting of a near-field communication (NFC) tag and a radio frequency identification (RFID) tag, and the one or more commands additionally causing the printing system to print asset information corresponding to the selected asset on the unprinted label to thereby create a printed label that can be affixed to the asset;
receiving the UID associated with the ID tag from the printing system;
in response to receiving the UID, updating a data record that is associated with the selected asset in the asset definition file with the UID associated with the ID tag; and
sending the plurality of assets and an updated asset definition file comprising the updated data record to the purchasing entity.

12. The non-transitory computer-readable medium of claim 11, wherein the data record is updated with the UID associated with the ID tag at substantially the same time as the asset information is printed on the unprinted label comprising the ID tag.

13. The non-transitory computer-readable medium of claim 11, wherein the method further comprises automatically sending the one or more commands to the printing system, automatically receiving the UID associated with the ID tag from the printing system, and automatically updating the data record that is associated with the asset in the asset definition file in response to receiving the user input.

14. The non-transitory computer-readable medium of claim 11, wherein:
the printing system is configured so that a plurality of unprinted ID tag-bearing labels are arranged in a sequence;
the plurality of unprinted ID tag-bearing labels are provided to a printing mechanism within the printing system in sequential order based on the sequence; and
the ID tag reader reads the ID tag from a next unprinted label in the sequence.

15. The non-transitory computer-readable medium of claim 11, wherein the method further comprises:
obtaining the asset information that is to be printed on the unprinted label from the asset definition file; and
sending the asset information that is to be printed on the unprinted label to the printing system.

* * * * *